United States Patent [19]

Halliburton et al.

[11] Patent Number: 4,887,898

[45] Date of Patent: Dec. 19, 1989

[54] FABRIC PROJECTION SYSTEM

[75] Inventors: Harold H. Halliburton, Roanoke; Mark S. Moseley, Vienna, both of Va.

[73] Assignee: Rowe Furniture Corporation, Arlington, Va.

[21] Appl. No.: 180,998

[22] Filed: Apr. 13, 1988

[51] Int. Cl.[4] ................ G03B 21/00

[52] U.S. Cl. ................ 353/28

[58] Field of Search ................ 434/94, 99; 350/124, 350/117, 121; 352/89, 85; 353/28, 30

[56] References Cited

U.S. PATENT DOCUMENTS

| | | | |
|---|---|---|---|
| 1,653,180 | 12/1927 | Jalbert | 353/28 |
| 2,196,587 | 4/1940 | Herrold . | |
| 2,301,274 | 11/1942 | Greiser . | |
| 2,591,428 | 4/1952 | Harris et al. | 353/29 |
| 2,899,860 | 8/1959 | Scott et al. | 353/38 X |
| 3,507,570 | 4/1970 | Bourdier et al. | 353/28 |
| 3,707,115 | 12/1972 | Rush | 353/28 X |

FOREIGN PATENT DOCUMENTS

| | | | |
|---|---|---|---|
| 0080039 | 7/1981 | Japan | 353/28 |

*Primary Examiner*—Harry N. Haroian

*Attorney, Agent, or Firm*—Fleit, Jacobson, Cohn, Price, Holman & Stern

[57] ABSTRACT

Disclosed is an image projection system for projecting pattern images onto a white three-dimensional object such as a sofa. A shadow box is provided for containing the white three-dimensional object comprising top, bottom, and side walls to surround the object. The inner faces of the side walls, rear wall, and the top facer of the bottom wall are painted black to absorb all light projected on it such that a white three dimensional object placed in the box reflects all the light projected into the box. A slide projection system is placed at a distance from the shadow box to project image patterns onto the three-dimensional object. The slides contained in the image projector are processed to scale and to match the area of illumination on the three dimensional object and also include a pattern identification number which is also projected onto the objects.

16 Claims, 2 Drawing Sheets

FABRIC PROJECTION SYSTEM

BACKGROUND OF THE INVENTION

The present invention relates to a display device and more particularly to a display device for projecting fabric patterns on a sofa.

In the retail furniture industry, showing a selection of sofa fabrics to a retail consumer is very difficult. The consumer is usually able to see only one or two fabrics on a sofa and then must rely on small samples. The retail consumer, in shopping for upholstered furniture, has a difficult time visualizing the different samples of upholstered fabrics as they would appear on a specific style of furniture. As a result, the consumer cannot make an accurate evaluation of the different fabric patterns. Furthermore, the retail store cannot provide an adequate display of all of its sofa fabric styles without the costly procedure of covering a sofa with each fabric style.

In the field of floor or wall coverings there have been devices designed to display various covering patterns. U.S. Pat. Nos. 2,196,587 and 2,301,274 to Herrold and Greiser, respectively, disclose devices for displaying patterns of floor, wall, or ceiling coverings onto a flat surface in a scaled down set. Although many patterns can be displayed, the scaled down set does not provide a realistic view of how the pattern would look in a life-size environment.

SUMMARY OF THE INVENTION

It is a primary object of this invention to provide a device for displaying fabric patterns onto an actual size sofa.

It is an additional object of this invention to provide a display device which displays a plurality of fabric patterns onto an actual size sofa to allow a retail consumer to make an accurate evaluation of the fabric patterns.

It is another object of this invention to provide a display device which displays large, life-size images of fabric patterns onto an actual size sofa.

The present invention comprises a display device for projecting photographic images onto a white sofa which is placed inside a shadow box. The shadow box includes two side walls, a bottom wall, a rear wall, a top wall and a partial front wall. The inner faces of the two side walls and rear walls, and the upper face of the bottom wall are painted black to absorb light. The partial front wall provides a border along the top and side walls to surround a viewing area in the box and supports an identifying sign.

A remote controlled slide projection system is mounted at a distance from the shadow box on a ceiling or wall. The projection system contains slides which are photographic images of fabric patterns scaled to match the size of the display object. Each slide includes an identification number which is also projected onto the display object. The projection system may be remotely operated or actuated periodically by timer.

The above and other objects and advantages of the present invention will become apparent when reference is made to the following description taken in conjunction with accompanying drawings.

DETAILED DESCRIPTION OF THE INVENTION

Figure 1:
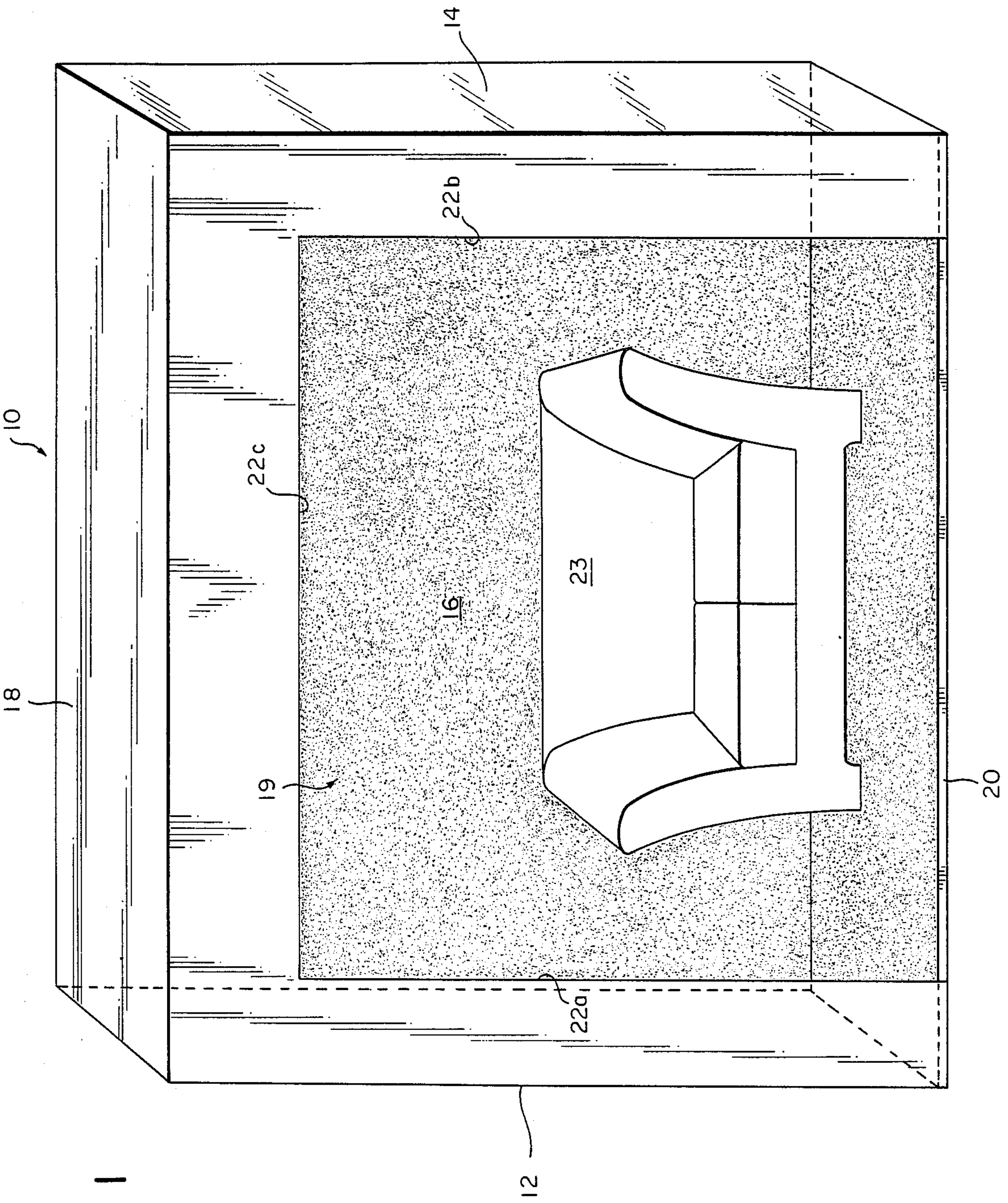
FIG. 1 is a front view of the shadow box containing a white sofa.

Referring first to FIG. 1, a shadow box 10 is shown comprising side walls 12 and 14, rear wall 16, top wall 18, and a bottom wall 20. A partial front wall comprising vertical sections **22*a* and 22*b* attached to the side walls 12 and 14 and a horizontal section 22*c* attached to top wall 18 provides a border around an open viewing area 19 of the box 10. The inner faces of the side walls 12 and 14, rear wall 16, and top face of the bottom wall 20 are painted black to absorb light. A white sofa 23 is placed inside the viewing area 19 of the shadow box 10**.

Figure 2:
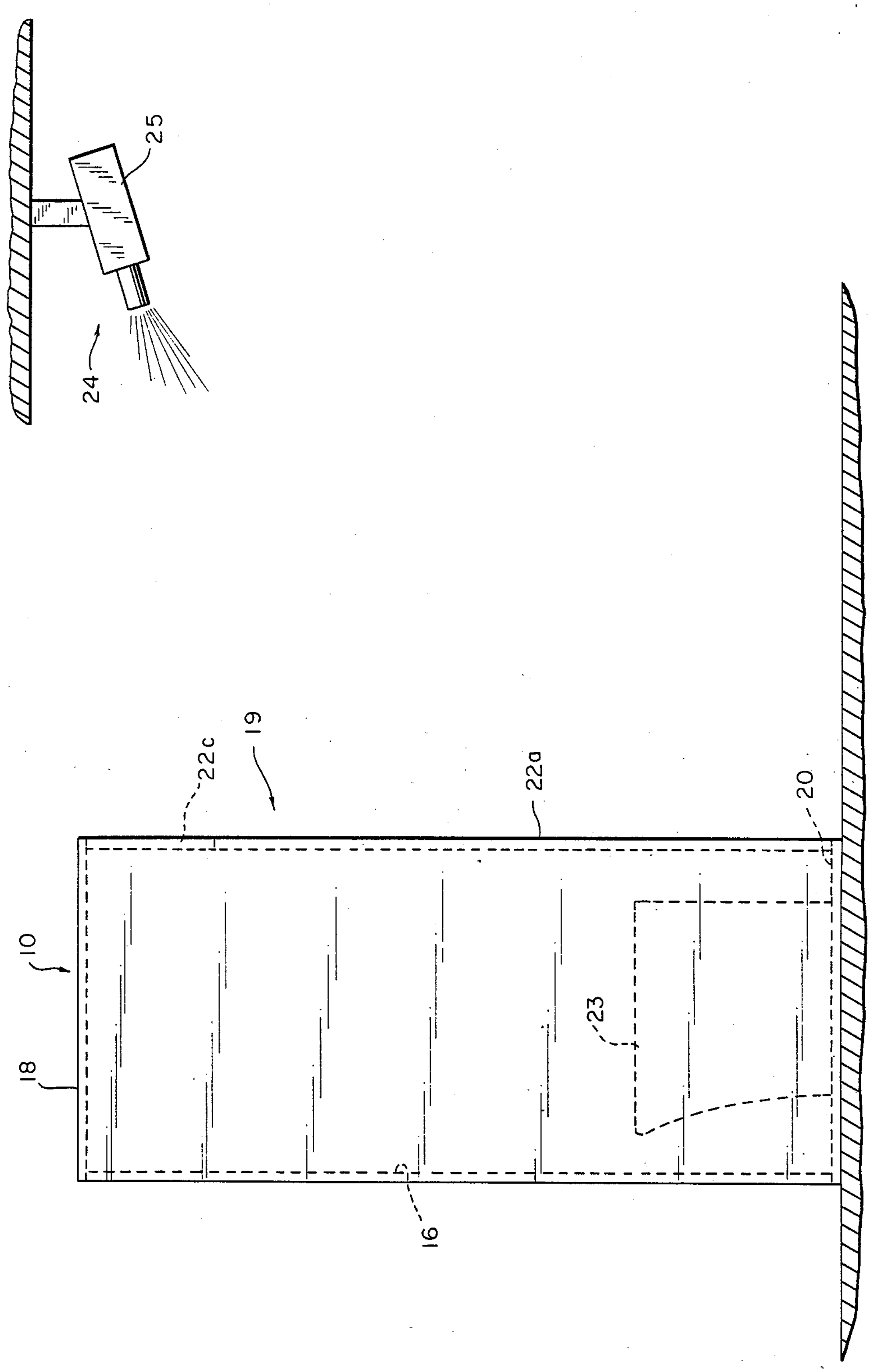
FIG. 2 is a side view of the display system of the present invention showing the shadow box and slide projection system.

FIG. 2 shows the use of the shadow box 10 with a projection system 24. The projection system 24 is mounted to a ceiling or wall, or otherwise supported at a distance from the shadow box 10 and aimed to project through the viewing area 19 of the box 10. The projection system 24 comprises a remote control slide projector 25 such as the Kodak Ektagraphic III AMT Slide Projector with an additional enhanced light module. The projection system 24 includes multicolored slides which are images of fabric patterns photographed to scale to match the area of illumination of the white sofa 23. A fabric identification number is processed on each slide so that each projected pattern is identifiable by its corresponding identification number. In addition, the projection system 24 also includes a timer for periodically switching the slides.

In operation, a white sofa 23 is placed within the viewing area 19 of the shadow box 10 as shown in FIG. 1. The slides containing the fabric patterns are placed in the slide projector 25. To display the fabric patterns, an operator uses the remote control of the projector 25. A multicolored scaled fabric pattern and its corresponding identification number is projected on the sofa. The projected fabric pattern covers the sofa 23 completely. The consumer carefully examines each pattern on the sofa 23 and notes the specific pattern desired.

Alternatively, the timer can be actuated in the projection system 24 for periodically switching the slides to allow a consumer to see all of the patterns automatically. When a desired pattern is seen, the timer can be deactivated to leave that desired pattern projected on the sofa for careful examination. Thereafter, the timer can be activated to continue displaying the remaining patterns.

The display system of the present invention allows sofa retail stores to display all of their fabric patterns on one sofa, thus avoiding the cost of expensive models while still allowing the consumer to make accurate, valued decisions from a life-size display.

It is understood that the above detailed description is intended by way of example only and is not intended to limit the invention in any way except as set forth in the following claims.

What is claimed is:

1. An image display system for projecting image patterns onto a three-dimensional object comprising:

a shadow box for containing a full-scale white three-dimensional object including at least two side walls, a top wall, a rear wall, and a bottom wall surrounding an open viewing area, and wherein the inner faces of the side walls, the rear wall, and the top face of the bottom wall are painted black; and a projection system positioned at a distance from the shadow box including a projector and a plurality of image patterns for projection onto the three-dimensional object, said image patterns being viewable on said three-dimensional object at a distance from said shadow box and at any position in front of said open viewing area of said shadow box.

2. The image display system of claim 1 wherein said shadow box includes a partial front wall having a horizontal portion extending between the two side walls along the top wall and two vertical portions extending from the top wall down to the bottom wall along the side walls to provide a border around the open viewing area of the shadow box.

3. The image display system of claim 2 wherein a sign or other identifying means is placed on the horizontal section of the partial front wall.

4. The image display system of claim 1 wherein said projector is a slide projector and said images are photographically processed multicolored slides.

5. The image display system of claim 1 wherein said projection system is mounted on a ceiling.

6. The image display system of claim 1 wherein said slide projection system includes a timer to periodically project a different pattern image.

7. The image display system of claim 6 wherein said pattern images are processed to match the size of the three dimensional object.

8. The image display system of claim 1 wherein said projection system is remote controlled.

9. The image display system of claim 1 wherein said image patterns include an identification number such that the corresponding identification number is projected onto the three dimensional object with each image pattern.

10. The image display system of claim 1 wherein said three dimensional object is a sofa and said image patterns are sofa fabric patterns.

11. An image display system for projecting a plurality of image patterns onto a three-dimensional full-size object, the system comprising:

a container for a full-size three-dimensional object of a neutral color, including a space surrounding an open viewing area; and a projection system located at a distance from said container including a projector and a plurality of image patterns for projection onto said three-dimensional object, said image patterns being viewable on said three-dimensional object at a distance from said container and at any position in front of said open viewing area of said container.

12. The image display system of claim 11 wherein said image patterns are projected on said full-size object such that they appear to cover the entire object with image patterns that are closely fitted in size and shape to said object.

13. The image display system of claim 11 wherein said container is of a light-absorbing nature.

14. The image display system of claim 11 wherein said object is a sofa and said image patterns are patterns of fabrics for covering sofas.

15. An apparatus for displaying fabric patterns onto a neutral colored, full-size article of furniture comprising:

a shadow box for containing said full-size article of furniture including at least two side walls, a top wall, a rear wall, and a bottom wall surrounding an open viewing area, and wherein the inner faces of said walls are dark; and a projection system positioned at a distance from the shadow box including a projector and a plurality of fabric patterns for projection onto said full-size article of furniture, said fabric patterns being viewable on said full-size article of furniture at a distance from said shadow box and at any position in front of said open viewing area of said shadow box.

16. A method for displaying fabric patterns out a neutral colored, full-size article of furniture, said method comprising the steps of:

placing said full-size article of furniture in front of a dark backdrop;

placing a projection system at a distance from and facing said full-size article of furniture;

sequentially projecting a plurality of fabric patterns onto said full-size article of furniture from said projection system.

* * * * *